United States Patent
Takeuchi et al.

(10) Patent No.: US 10,189,371 B2
(45) Date of Patent: Jan. 29, 2019

(54) ELECTRICALLY-POWERED VEHICLE

(71) Applicant: SUBARU CORPORATION, Tokyo (JP)

(72) Inventors: Kota Takeuchi, Tokyo (JP); Hikaru Tanifuji, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 15/785,168

(22) Filed: Oct. 16, 2017

(65) Prior Publication Data

US 2018/0111501 A1 Apr. 26, 2018

(30) Foreign Application Priority Data

Oct. 21, 2016 (JP) .................. 2016-206523

(51) Int. Cl.
| | |
|---|---|
| *B60K 1/04* | (2006.01) |
| *B60L 11/18* | (2006.01) |
| *H01M 2/10* | (2006.01) |
| *H01M 10/46* | (2006.01) |

(52) U.S. Cl.
CPC ............ *B60L 11/1879* (2013.01); *B60K 1/04* (2013.01); *B60L 11/1816* (2013.01); *B60L 11/1877* (2013.01); *H01M 2/1072* (2013.01); *H01M 10/46* (2013.01); *B60K 2001/0416* (2013.01); *B60K 2001/0438* (2013.01); *B60Y 2200/91* (2013.01); *B60Y 2200/92* (2013.01); *B60Y 2306/01* (2013.01); *H01M 2220/20* (2013.01); *Y10S 903/903* (2013.01)

(58) Field of Classification Search
CPC ..... B60K 1/04; B60L 11/1812; B60L 11/1814
See application file for complete search history.

(56) References Cited

U.S. PATENT DOCUMENTS

2014/0320078 A1 10/2014 Nakamura et al.
2016/0093849 A1* 3/2016 DeKeuster .......... H01M 2/1077
429/61

FOREIGN PATENT DOCUMENTS

| JP | H 04-299029 A | 10/1992 |
|---|---|---|
| JP | 2013-147043 A | 8/2013 |
| JP | 2015-103486 A | 6/2015 |
| JP | 5825356 B2 | 12/2015 |

* cited by examiner

*Primary Examiner* — Bryan A Evans
(74) *Attorney, Agent, or Firm* — McGinn I.P. Law Group, PLLC (57) ABSTRACT

An electrically-powered vehicle includes a high voltage battery, a charger, and a battery case. The high voltage battery stores electric power for travelling. The charger outputs charge current to the high voltage battery. The battery case accommodates the high voltage battery. The battery case includes a low stiffness material member that covers one side of the high voltage battery in a horizontal direction and that is formed of a material having stiffness lower than stiffness of a portion that covers the other side in the horizontal direction. The low stiffness material member and the charger are fastened to each other at different locations in the horizontal direction.

18 Claims, 6 Drawing Sheets

FIG. 6B

ELECTRICALLY-POWERED VEHICLE

CROSS-REFERENCE TO RELATED APPLICATIONS

The present application claims priority from Japanese Patent Application No. 2016-206523 filed on Oct. 21, 2016, the entire contents of which are hereby incorporated by reference.

BACKGROUND

1. Technical Field

The present invention relates to an electrically-powered vehicle equipped with a high voltage battery.

2. Related Art

An electrically-powered vehicle such as an electric vehicle (EV) or a hybrid electric vehicle (HEV) is equipped with a high voltage battery that stores electric power for travelling. The high voltage battery contains a harmful electrolytic solution, has a high output voltage, and stores a high power. Accordingly, the high voltage battery is protected with high strength so as not to be crushed or shifted from the body of the electrically-powered vehicle even when the electrically-powered vehicle crashes.

A conventional high voltage battery is typically protected with high strength in a manner in which the high voltage battery is surrounded by a battery case having high stiffness, and the battery case is secured to a frame of the body of the electrically-powered vehicle.

The electrically-powered vehicle includes a charger, as peripheral equipment of the high voltage battery, which supplies charge current to the high voltage battery. In the charger, a circuit board for charge is accommodated in a housing having relatively high stiffness.

Several techniques related to the arrangement of the high voltage battery and peripheral equipment thereof have been proposed. For instance, Japanese Patent No. 5825356 discloses that a high voltage battery and a non-contact power receiver are stacked in the vertical direction, and that a part of the non-contact power receiver protrudes from the high voltage battery to the rear side when viewed from above. Japanese Patent No. 5825356 discloses that such arrangement enables the non-contact power receiver to absorb an impact to protect the high voltage battery even when a rear collision of an electrically-powered vehicle occurs.

Japanese Unexamined Patent Application Publication No. 2013-147043 discloses that a charger is secured to an upper portion of a high voltage battery with a frame interposed therebetween. Japanese Unexamined Patent Application Publication No. 4-299029 discloses that a stay for reinforcement is secured to a rear-end surface of a battery case that accommodates a high voltage battery, and that a charger is mounted on the stay for reinforcement. Japanese Unexamined Patent Application Publication No. 2015-103486 discloses that an equipment case that accommodates a charger is directly mounted on a battery case of a high voltage battery.

The high voltage battery is heavy and typically disposed in a lower portion of the body of the electrically-powered vehicle. In the case where the charger is disposed far away from the high voltage battery, the length of a cable connecting the charger and the high voltage battery with each other is long, and charge voltage largely drops accordingly. For this reason, the charger is preferably disposed near the high voltage battery.

In recent years, the capacity of the high voltage battery equipped with the electrically-powered vehicle increases, and accordingly, the volume and width of the high voltage battery increase in some cases. In these cases, the high voltage battery and the charger are arranged in the horizontal direction and disposed in a lower portion of the body, and this brings advantages that a space below a vehicle cabin of the electrically-powered vehicle is effectively used, that a wasted space is eliminated, and that components thereof can be disposed therein.

However, in some cases where the high voltage battery is accommodated in a battery case having high stiffness and the high voltage battery and the charger are arranged in the horizontal direction when a layout of the electrically-powered vehicle is designed, a slight deficiency in an arrangement space below the vehicle cabin occurs. The battery case is formed of a thick member surrounding the high voltage battery to achieve the required high stiffness. Considering the thickness of the battery case, a deficiency in the arrangement space occurs on rare occasions although a decrease in the thickness of the battery case enables the high voltage battery and the charger to be arranged.

In this case, merely decreasing the thickness of the battery case does not enable the high voltage battery to be protected with high strength because of the layout of the components. In this case, the high voltage battery and the charger can be disposed below the vehicle cabin so as to be stacked in the vertical direction. However, such a layout needs a protruding portion for shunning the charger on a bottom plate of the vehicle cabin because a part of the charger protrudes upward. In this case, there is a problem in that the floor surface of the vehicle cabin cannot be flat.

SUMMARY OF THE INVENTION

It is desirable to provide an electrically-powered vehicle that enables the high voltage battery to be protected with high strength and that has a decreased arrangement space in the case where the high voltage battery and the charger are arranged in the horizontal direction.

An aspect of the present invention provides an electrically-powered vehicle including a high voltage battery configured to store electric power for travelling, a charger configured to output charge current to the high voltage battery, and a battery case that accommodates the high voltage battery. The battery case includes a low stiffness material member that covers one side of the high voltage battery in a horizontal direction and that is formed of a material having stiffness lower than stiffness of a portion that covers the other side in the horizontal direction. The low stiffness material member and the charger are fastened to each other at different locations in the horizontal direction.

DETAILED DESCRIPTION

An example of the present invention will hereinafter be described in detail with reference to the drawings. In the description, a front-rear direction, a vertical direction, and a left-right direction mean the same as the front-rear direction, the vertical direction, and the left-right direction of an electrically-powered vehicle 1. The term "fasten" means that two components are firmly joined to each other with a fastener such as a bolt.

Figure 1:
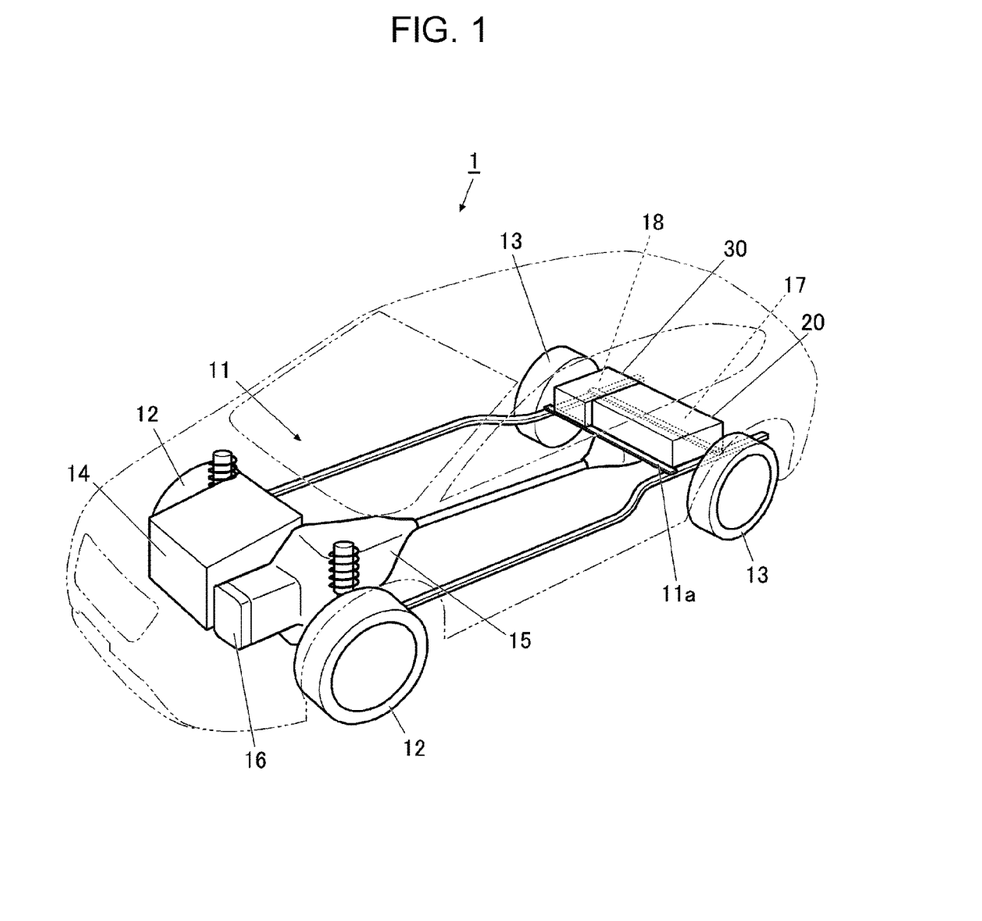
FIG. 1 is a perspective view of a principal part of an electrically-powered vehicle according to an example of the present invention.

FIG. 1 is a perspective view of a principal part of the electrically-powered vehicle according to the example of the present invention.

The electrically-powered vehicle 1 according to the example is, for instance, a hybrid electric vehicle (HEV) and includes a body 11, a pair of front wheels 12, a pair of rear wheels 13, an engine 14, a driving force transmitter 15, and a motor 16 for travelling, as illustrated in FIG. 1. The electrically-powered vehicle 1 also includes a battery case 20 that accommodates a high voltage battery 17, and a charger holder 30 that accommodates a charger 18.

The body 11 is a structure forming a frame of the vehicle body and holds components such as the engine 14, the motor 16 for travelling, and the driving force transmitter 15. Examples of the structure of the body 11 may include a monocoque structure and a frame structure. The body 11 includes a beam 11a extending in a vehicle width direction between components corresponding to lower rear portions of the electrically-powered vehicle 1, for instance, the pair of the rear wheels 13. The battery case 20 that accommodates the high voltage battery and the charger holder 30 that accommodates the charger 18 are secured to the beam 11a.

The engine 14 burns fuel to produce motive power for travelling.

The motor 16 for travelling produces motive power for travelling by using electric power.

The driving force transmitter 15 transmits the motive power of the engine 14 and the motive power of the motor 16 for travelling to the rear wheels 13 or both the front wheels 12 and the rear wheels 13.

The high voltage battery 17 stores electric power for travelling and supplies the electric power to the motor 16 for travelling.

The battery case 20 accommodates the high voltage battery 17 and is secured to the body 11. The battery case 20 has high stiffness and protects the high voltage battery 17 with high strength so that the high voltage battery 17 is prevented from being crushed or shifted from the body 11 even when the electrically-powered vehicle 1 collides with something. The detailed structure of the battery case 20 will be described later.

The charger 18 receives electric power supplied from the outside of the electrically-powered vehicle 1 via a charging cable and outputs charge current to the high voltage battery 17. The charger 18 may receive electric power produced by using the motive power of the engine 14 or regenerative energy due to braking of the electrically-powered vehicle 1 and may output charge current to the high voltage battery 17. The charger 18 includes a circuit board for charge accommodated in a housing formed of, for instance, aluminum alloy and has relatively high stiffness.

The charger 18 is fastened to the charger holder 30, which holds the charger 18. A part of the charger holder 30 also serves as a part of the battery case 20. The charger holder 30 is formed of a material having stiffness lower than the stiffness of a portion of the battery case 20 having high stiffness. According to the example, the charger holder 30 is in the form of a case that accommodates the charger 18 but is not particularly limited thereto. The detailed structure of the charger holder 30 will be described later.

Structure of Battery Case

Figure 2:
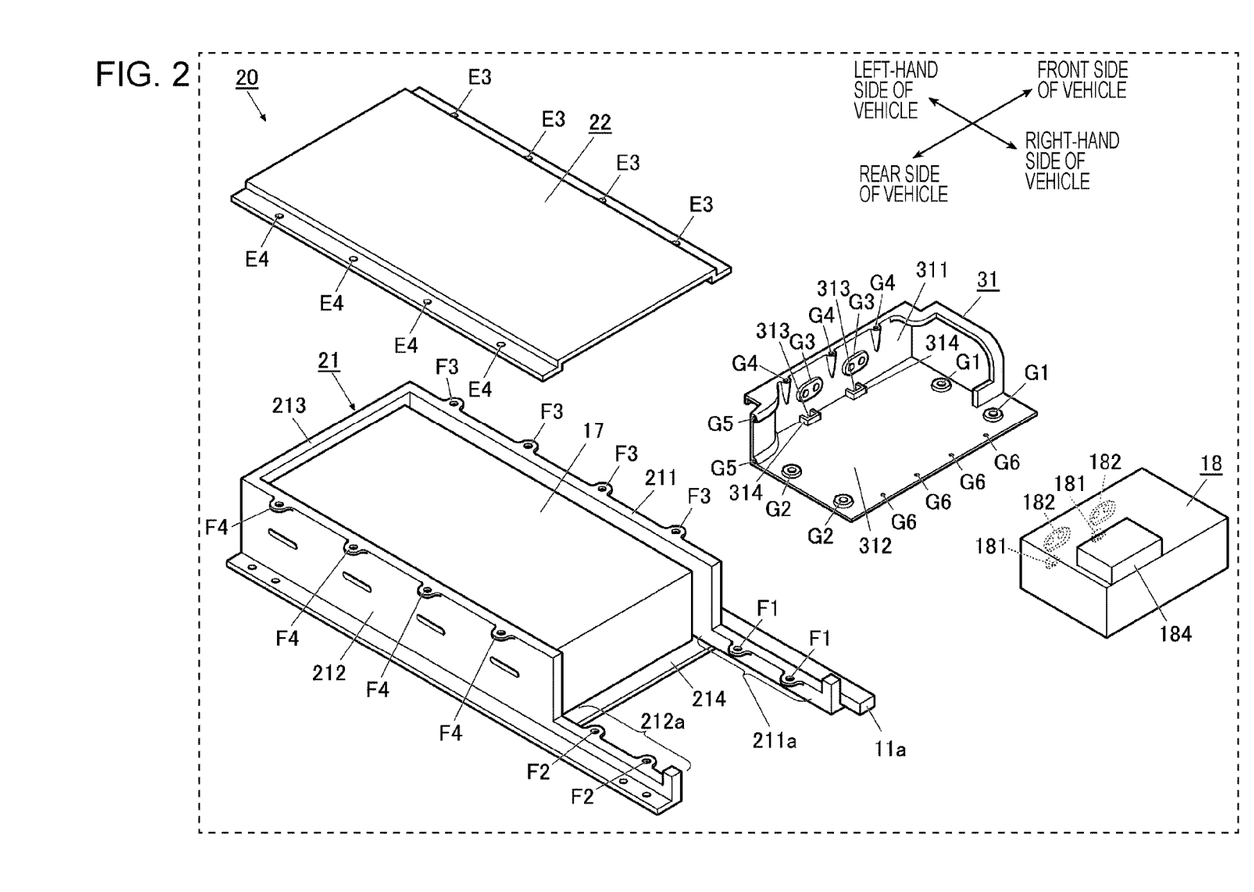
FIG. 2 is an exploded perspective view of a battery case according to the example.

FIG. 2 is an exploded perspective view of the battery case according to the example.

The battery case 20 includes a case main body 21, a lid 22, and a thin plate 31. Portions of the case main body 21 that cover at least three sides (the front side, the rear side, and the left-hand side) in the horizontal direction correspond to exemplary high stiffness material members according to the example of the present invention. The thin plate 31 corresponds to an exemplary low stiffness material member according to the example of the present invention.

The case main body 21 covers the high voltage battery 17 from four sides of the lower side, the front side, the rear side, and the left-hand side. The case main body 21 opens on the upper side and the right-hand side in the horizontal direction. The case main body 21 is fastened to the beam 11a of the body 11.

As exemplified in FIG. 2, the case main body 21 is formed such that a bottom plate 214, a front wall 211, a rear wall 212, and a left wall 213 that each have a plate shape are bonded to each other with high strength or are molded by one-piece molding although this is not a limitation. The bottom plate 214 extends in the horizontal direction and covers the lower side of the high voltage battery 17. The front wall 211, the rear wall 212, and the left wall 213 extend in the vertical direction and cover the front side, the rear side, and the left-hand side of the high voltage battery 17, respectively.

The portions (the front wall 211, the rear wall 212, and the left wall 213) of the case main body 21 that cover at least three sides in the horizontal direction are each formed of a high stiffness material having a large thickness. Examples of the high stiffness material include a thick plate and a metallic plate material having a hollow rib structure or a hollow honeycomb structure. Steel or high tensile strength steel can be used as the high stiffness material. The high stiffness material may be a resin material having high stiffness.

The lid 22 covers an upper opening of the case main body 21. The lid 22 is fastened to the case main body 21 by using, for instance, fasteners (for instance, bolts. The same is true for the following description). As exemplified in FIG. 2, fastening portions F3 and F4 disposed on upper portions of the case main body 21 so as to extend in the horizontal direction are fastened to bolt insertion holes E3 and E4 formed in edge portions of the lid 22 by using fasteners.

In the case main body 21, the front wall 211 that covers the front side and the rear wall 212 that covers the rear side respectively include extensions 211a and 212a extending in a direction in which the battery case 20 and the charger 18 are arranged. The extensions 211a and 212a each have a height less than the height of the front wall 211 or the rear wall 212 that covers the high voltage battery 17 and extend up to positions at which the extensions 211a and 212a and the charger 18 line up. The extensions 211a and 212a include fastening portions F1 and F2. For instance, the structure of the fastening portions F1 and F2 can include bolt holes formed in protruding pieces that extend laterally from upper portions of the extensions 211a and 212a.

The thin plate 31 is a member that covers a right-hand-side opening of the case main body 21 and that holds the charger 18. The charger 18 is fastened to the thin plate 31. The thin plate 31 is formed of a low stiffness material having stiffness lower than the stiffness of the high stiffness material of which a part of the case main body 21 is formed. Examples of the low stiffness material can include a metallic thin plate. The low stiffness material may be a metallic thin plate including, at an end thereof, a bent portion for reinforcement that has an L-shaped section or a U-shaped section (see a portion C1 at an end of a side plate 311 in FIG. 4). The low stiffness material may be steel or aluminum alloy. The low stiffness material may be a thin resin material having stiffness that is sufficient to hold the charger 18 and that is lower than the stiffness of the high stiffness material.

Figure 4:
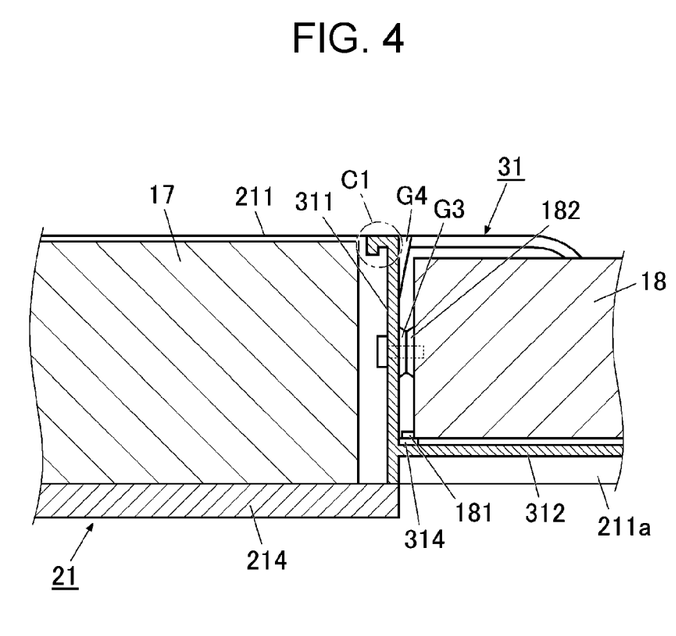
FIG. 4 is a sectional view of FIG. 3 taken along line IV-IV.

The thin plate 31 includes the side plate 311 that extends in the vertical direction and that covers the right-hand-side opening of the case main body 21 and a horizontal plate 312 extending from the side plate 311 in the horizontal direction. As illustrated in FIG. 4, the side plate 311 and the horizontal plate 312 are joined to each other so as to form an L-shaped section or a sideways T-shaped section or molded into this form by one-piece molding.

The side plate 311 includes fastening portions G3 fastened to the charger 18. Each fastening portion G3 includes a base that extends in the form of a boss and that has bolt insertion holes so that bolts can be fastened with a large torque. The bolt insertion holes of each fastening portion G3 are formed at different locations in the horizontal direction.

The charger 18 is disposed above the horizontal plate 312. The horizontal plate 312 includes fastening portions G1 and G2 fastened to the case main body 21. The fastening portions G1 and G2 each include a base that extends in the form of, for instance, a boss and that has a bolt insertion hole so that a bolt can be fastened with a large torque.

Grooves 313 in which respective legs 181 of the charger 18 are inserted are formed on the boundary between the side plate 311 and the horizontal plate 312 of the thin plate 31. Ribs 314 that extend upward and that engage the respective legs 181 of the charger 18 are formed around the corresponding grooves 313.

An upper portion and a rear portion of the side plate 311 have bolt holes G4 and G5. A right edge portion of the horizontal plate 312 has bolt insertion holes G6 extending in the vertical direction.

The charger 18 includes fastening portions 182 and the legs 181. Each fastening portion 182 includes a boss that extends in the form of a boss and that has bolt holes. The fastening portions 182 are disposed on the left-hand-side surface of the charger 18 and correspond to the fastening portions G3 of the thin plate 31. The legs 181 extend in the form of a hook on a left-hand-side lower portion of the charger 18 and are disposed at positions corresponding to the grooves 313 and the ribs 314 of the thin plate 31 for positioning of the charger 18. The charger 18 may include, on the upper surface thereof, a protruding portion 184 (for instance, a cooling fan).

Effects of Battery Case

Figure 3:
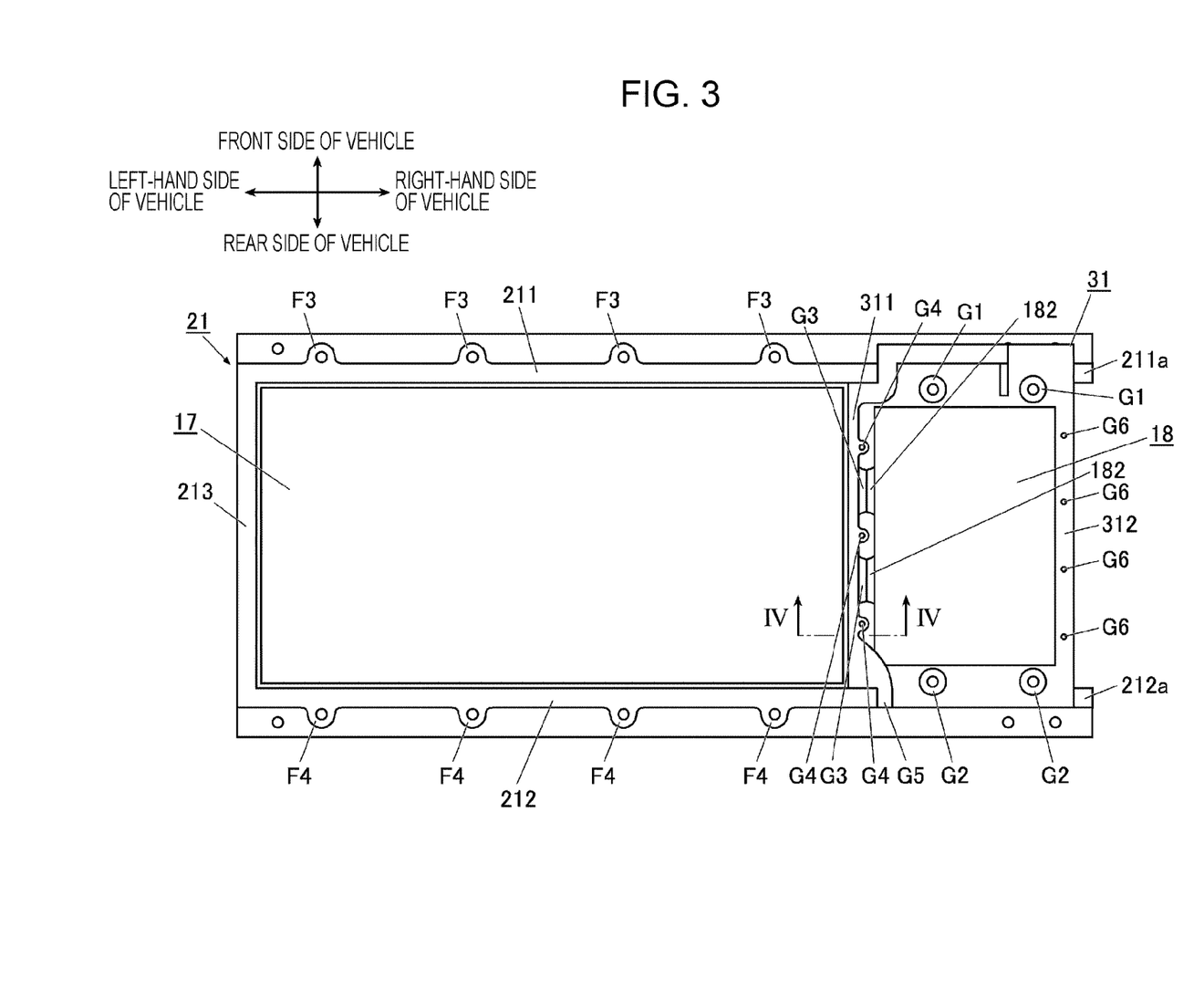
FIG. 3 is a plan view of a case main body and a thin plate of a battery case that are fastened to each other.

FIG. 3 is a plan view of the case main body and the thin plate of the battery case that are fastened to each other. FIG. 4 is a sectional view of FIG. 3 taken along line IV-IV.

In the battery case 20 having the above structure, as illustrated in FIG. 2, the high voltage battery 17 is disposed in a receptacle of the case main body 21. The thin plate 31 holding the charger 18 is fastened to the case main body 21 with the case main body 21 fastened to the beam 11a. FIG. 3 illustrates this state viewed from above. The case main body 21 and the thin plate 31 are secured to each other in a manner in which the fastening portions F1 and F2 (see FIG. 2) of the case main body 21 and the fastening portions G1 and G2 of the thin plate 31 are fastened to each other by using fasteners (for instance, bolts. The same is true for the following description). Thus, the side plate 311 of the thin plate 31 covers the right-hand-side opening of the case main body 21. The lid 22 is fastened to the case main body 21 by using fasteners. Thus, the high voltage battery 17 is accommodated in the battery case 20 so as to be surrounded from the front-rear direction, the vertical direction, and the left-right direction.

The side plate 311 of the thin plate 31 is fastened to the fastening portions 182 of the charger 18 at the fastening portions G3. Consequently, the stiffness of the charger 18 is added to the stiffness of the side plate 311 of the thin plate 31. Accordingly, the stiffness of the side plate 311 of the thin plate 31 is greatly increased unlike the case of the thin plate 31 alone. In addition, the side plate 311 and the horizontal plate 312 of the thin plate 31 are joined to each other so as to form an L-shaped section or a sideways T-shaped section or molded into this form by one-piece molding. Accordingly, the horizontal plate 312 and the side plate 311, the stiffness of which is greatly increased by the charger 18 form a three-dimensional frame and achieve high stiffness of the entire thin plate 31.

The thin plate 31 having high stiffness is fastened to the case main body 21 in the above manner, and the front wall 211 and the rear wall 212 of the case main body 21 are thereby supported with high stiffness. Accordingly, the front wall 211 and the rear wall 212 are unlikely to be deformed due to an impact in a direction in which the front wall 211 and the rear wall 212 approach or are separated from each other even when the right-hand side of the case main body 21 opens, and high stiffness of the entire battery case 20 is achieved. The high stiffness of the battery case 20 enables the high voltage battery 17 to be protected with high strength.

The side plate 311 of the thin plate 31 is disposed between the high voltage battery 17 and the charger 18, and a side plate of a high stiffness material is not disposed in the case main body 21. Accordingly, the width of the arrangement space for the high voltage battery 17 and the charger 18 can be less than that in the case where the high voltage battery 17 is surrounded by a high stiffness material from the four sides in the horizontal direction and the high voltage battery 17 and the charger holder 30 are arranged sideways.

The component cost and weight of a high stiffness material are high. Accordingly, the component cost and the component weight can be reduced in a manner in which a side plate of a high stiffness material is not disposed between the high voltage battery 17 and the charger 18.

The side plate 311 of the thin plate 31 is fastened to the charger 18, the side plate 311 is not fastened to the case main body 21, and the horizontal plate 312 is fastened to the case main body 21. If the side plate 311 includes a portion fastened to the case main body 21, many fastening portions occupy a large percentage of the limited area of the side plate 311 and are disposed close together, which makes a fastening process very complex. The above structure, however, avoids disposing the fastening portions close together on the side plate 311 of the thin plate 31 and ensures sufficient stiffness of the thin plate 31 and the battery case 20.

As illustrated in FIG. 3, the side plate 311 of the thin plate 31 may be interposed between the front wall 211 and the rear wall 212 of the case main body 21. This enables the side plate 311 of the thin plate 31 to support portions of the front wall 211 and the rear wall 212 of the case main body 21 that cover the high voltage battery 17 from the inner surface side. Thus, the stiffness of the battery case 20 can be further increased.

According to the example, the charger 18 is fastened to the side plate 311 of the thin plate 31. However, the charger 18 may be fastened to both the side plate 311 and the horizontal plate 312 of the thin plate 31. This enables the stiffness of the thin plate 31 to be further increased. According to the example, the case main body 21 is fastened to the horizontal plate 312 of the thin plate 31. However, the case main body 21 may be fastened to the side plate 311 of the thin plate 31. In this case, the side plate 311 of the thin plate 31 may be fastened to any one of or some of the front wall 211, the rear wall 212, the bottom plate 214, and the lid 22 of the case main body 21. With this structure, the stiffness of the battery case 20 can be further increased.

Structure of Charger Holder

Figure 5:
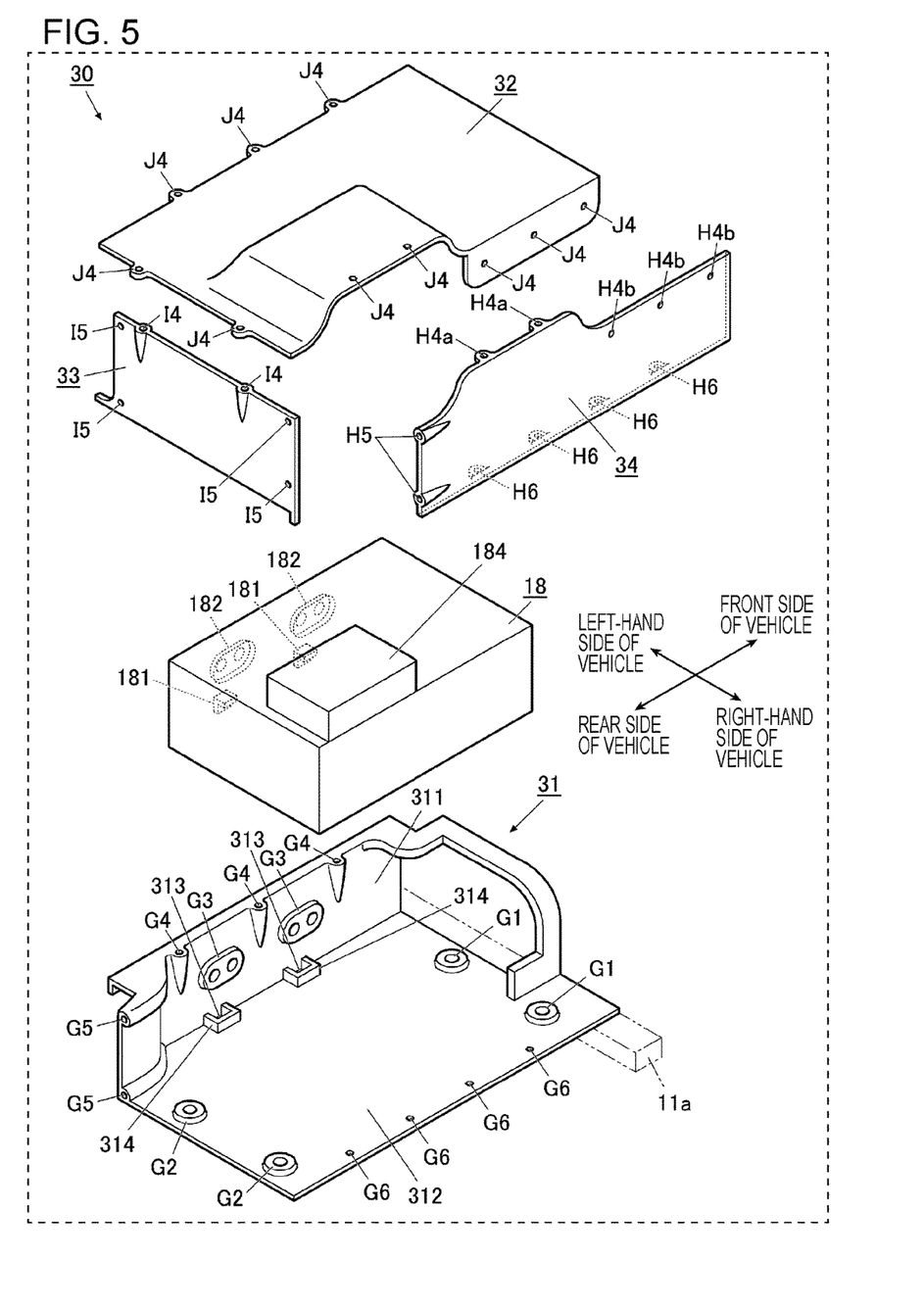
FIG. 5 is an exploded perspective view of a charger holder according to the example.

FIG. 5 is an exploded perspective view of the charger holder according to the example.

The charger holder 30 includes the thin plate 31, a lid 32, a rear plate 33, and a right plate 34.

The thin plate 31 is a member that also serves as a part of the battery case 20, and the detailed structure thereof is described above.

The right plate 34 is a plate-shaped member that covers the right-hand side of the charger 18 and is formed of a low stiffness material as in the thin plate 31. A lower portion of the right plate 34 has bolt holes H6 corresponding to the bolt insertion holes G6 of the thin plate 31. A rear end portion of the right plate 34 has bolt holes H5 facing in the front-rear direction. An upper portion of the right plate 34 has bolt holes H4a facing in the vertical direction and bolt holes H4b facing in the left-right direction.

The rear plate 33 is a plate-shaped member that covers the rear side of the charger 18 and is formed of a low stiffness material as in the thin plate 31. Left and right edge portions of the rear plate 33 have bolt insertion holes I5 corresponding to the bolt holes G5 of the thin plate 31 and the bolt holes H5 of the right plate. An upper portion of the rear plate 33 has bolt holes I4 facing in the vertical direction.

The lid 32 is a plate-shaped member that covers the upper side of the charger 18 and is formed of a low stiffness material as in the thin plate 31. The lid 32 has bolt insertion holes J4 corresponding to the bolt holes G4 of the thin plate 31, the bolt holes I4 of the rear plate 33, and the bolt holes H4a and H4b of the right plate 34. For instance, the lid 32 may be formed in a shape partially extending so as to shunt the protruding portion 184 on the upper surface of the charger 18.

In the charger holder 30, the thin plate 31, the rear plate 33, and the right plate 34 are fastened to each other by using fasteners with the charger 18 fastened to the thin plate 31. The lid 32 is fastened to this structure by using fasteners. Thus, the charger holder 30 is formed in a three-dimensional shape surrounding the charger 18. The charger holder 30 having such a three-dimensional shape has increased stiffness as a whole unlike the case of the thin plate 31, to which the charger 18 is fastened, alone.

The charger holder 30 having increased stiffness is fastened to the case main body 21 of the battery case 20, and accordingly, the stiffness of the battery case 20 can be increased.

Arrangement of Battery and Charger

Figure 6A:
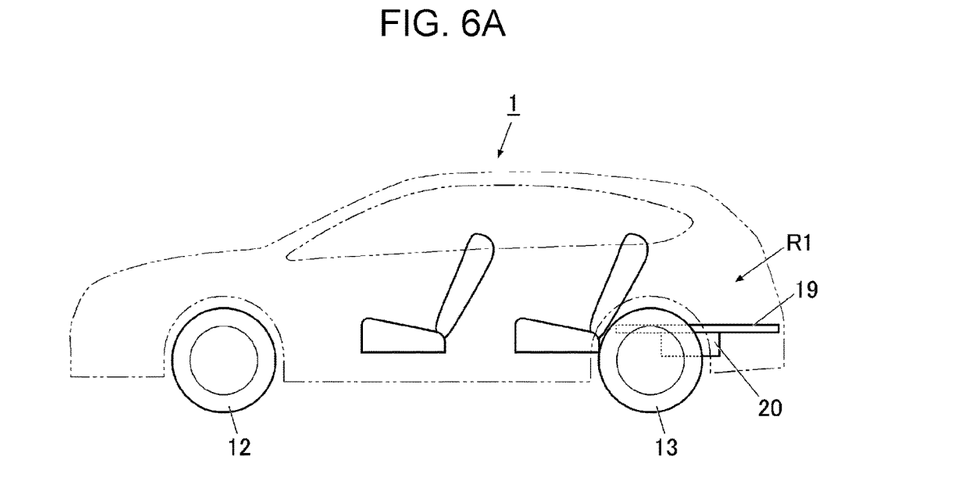
FIG. 6A is a side view of a floorboard of a luggage compartment, a battery, and a charger of the electrically-powered vehicle according to the example and illustrates the relationship of arrangement thereof.
Figure 6B:
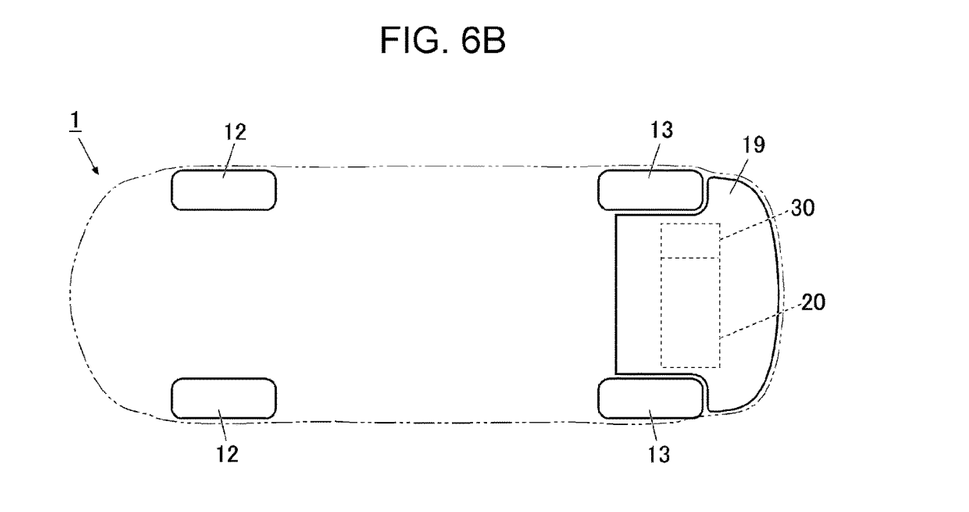
FIG. 6B is a plan view of the floorboard of the luggage compartment, the battery, and the charger of the electrically-powered vehicle according to the example and illustrates the relationship of arrangement thereof.

FIGS. 6A and 6B are a side view and a plan view of a floorboard of a luggage compartment, the battery, and the charger of the electrically-powered vehicle according to the example and illustrates the relationship of arrangement thereof.

As illustrated in FIGS. 6A and 6B, the battery case 20 accommodating the high voltage battery 17 and the charger holder 30 holding the charger 18 are arranged in the vehicle width direction below a luggage compartment R1.

The length of the arrangement space below the luggage compartment R1 in the vehicle width direction is limited. Accordingly, in the case where the battery case is formed such that the high voltage battery 17 is surrounded by a thick high stiffness material from the front-rear direction and the left-right direction, the arrangement space is slightly deficient in the width, and it is difficult for the battery case and the charger holder to be arranged in the left-right direction in some cases. In these cases, stacking the charger 18 on the high voltage battery 17 makes a problem in that the floor of the luggage compartment R1 cannot be flat.

According to the example, however, the dimension in the vehicle width direction in the case where the battery case 20 and the charger holder 30 are arranged in the left-right direction can be decreased in a manner in which the thin plate 31 of the charger holder 30 also serves as a partition on the right-hand side of the battery case 20. Accordingly, even in the above cases, the battery case 20 and the charger holder 30 can be arranged in the left-right direction in the arrangement space below the luggage compartment R1. This enables the high voltage battery 17 and the charger 18 to be disposed without a wasted space and enables a bottom plate 19 of the luggage compartment R1 to be flat.

In the battery case 20 according to the example, the thin plate 31 is fastened to the charger 18 to increase the stiffness of the thin plate 31, and hence sufficient stiffness of the battery case 20 is ensured. It is assumed that a strong impact is applied to the battery case 20 in the front-rear direction when a front collision or a rear collision of the electrically-powered vehicle 1 occurs. In view of this, in the battery case 20 according to the example, the thin plate 31 fastened to the charger 18 extends in the front-rear direction. With this arrangement, the high stiffness of the battery case 20 enables the high voltage battery 17 to be protected with high strength against the impact in the front-rear direction of the electrically-powered vehicle 1.

The example of the present invention is described above. However, the present invention is not limited to the example. For instance, although the high voltage battery 17 is disposed on the left-hand side and the charger 18 is disposed on the right-hand side according to the example, the left-hand side and the left-hand side may be reversed. Although the charger holder 30 is in the form of a case that accommodates the charger 18 according to the example, it is only necessary for the charger holder to be able to hold the charger, and, for instance, portions other than the thin plate may be omitted.

According to the example, the thin plate 31 includes the side plate and the horizontal plate and is attachable to and detachable from the case main body 21. However, the thin plate 31 may be joined to the case main body 21 in advance by, for instance, welding. The thin plate 31 and the case main body 21 may be molded by one-piece molding such that a portion of the thin plate 31 is thinner than the other portions. The horizontal plate of the thin plate 31 may be omitted.

According to the example, the high voltage battery 17 has a rectangular cuboid shape, and an accommodating space of the battery case 20 has a rectangular cuboid shape. However, the outer surface of the high voltage battery may include a curved surface or irregularities, and the accommodating space of the battery case may have a shape following the outer surface of the high voltage battery 17. According to the example, the surface of the charger 18 facing the high voltage battery 17 is substantially flat, and the side plate 311 of the thin plate 31 has a substantially plate shape. However, the surface of the charger facing the high voltage battery may include a curved surface or irregularities, and the side plate of the thin plate 31 may have a shape following the shape of the charger.

According to the example, the high stiffness material and the low stiffness material of the battery case 20 are different from each other. However, the high stiffness material and the low stiffness material may be the same material, and the thicknesses or structures thereof may be different from each other such that the stiffness of the high stiffness material differs from the stiffness of the low stiffness material. The details described according to the example can be appropriately changed without departing from the spirit of the present invention.

According to the example, the electrically-powered vehicle is a hybrid electric vehicle. However, the electrically-powered vehicle may be an electric vehicle or a fuel cell vehicle (FCV) including the high voltage battery.

According to the present invention, the thickness of the low stiffness material member of the battery case that covers one side of the high voltage battery in the horizontal direction can be less than the thickness of a portion that covers the other side of the high voltage battery in the horizontal direction. Accordingly, the total width of the battery case and the charger that are arranged in the horizontal direction can be decreased. The low stiffness material member is fastened to the charger at different locations in the horizontal direction and has increased stiffness. This achieves high stiffness of the entire battery case including the low stiffness material member fastened to the charger. Accordingly, the high voltage battery can be protected with high strength, and the arrangement space for the high voltage battery and the charger can be decreased, in the case where the high voltage battery and the charger are arranged in the horizontal direction.

The invention claimed is:

1. An electrically-powered vehicle, comprising:
    a high voltage battery configured to store electric power for travelling the electrically-powered vehicle;
    a charger configured to output charge current to the high voltage battery, the charger including a first housing and a first circuit board accommodated in the first housing; and
    a second housing including a first face, a second face opposed to the first face in a first direction, and a space defined between the first face and the second face that accommodates the high voltage battery,
    wherein the first face comprises a low stiffness portion having stiffness lower than a stiffness of the second face, and
    wherein the low stiffness portion is fastened to the charger at different locations that are disposed separately from each other in a second direction orthogonal to the first direction.

2. The electrically-powered vehicle according to claim 1,
    wherein the high voltage battery and the charger are arranged in the first direction, and
    wherein, in the first direction, the low stiffness portion is disposed between the high voltage battery and the charger.

3. The electrically-powered vehicle according to claim 2,
    wherein the high voltage battery and the charger are disposed below a luggage compartment, and arranged aligned in a vehicle width direction.

4. The electrically-powered vehicle according to claim 1,
    wherein the low stiffness portion comprises a side plate that extends in the second direction and that covers the one side of the high voltage battery and a horizontal plate extending from the side plate in the first direction, and
    wherein the charger is fastened to the side plate and disposed above the horizontal plate.

5. The electrically-powered vehicle according to claim 2,
    wherein the low stiffness portion comprises a side plate that extends in the second direction and that covers the one side of the high voltage battery and a horizontal plate extending from the side plate in the first direction, and
    wherein the charger is fastened to the side plate and disposed above the horizontal plate.

6. The electrically-powered vehicle according to claim 3,
    wherein the low stiffness portion comprises a side plate that extends in the second direction and that covers the one side of the high voltage battery and a horizontal plate extending from the side plate in the first direction, and
    wherein the charger is fastened to the side plate and disposed above the horizontal plate.

7. The electrically-powered vehicle according to claim 1,
    wherein the second housing comprises the low stiffness portion, and a high stiffness portion having stiffness higher than the stiffness of the low stiffness portion,
    wherein the high stiffness portion comprises:
        walls extending from the first face in the first direction and disposed separately from each other in the second direction; and
        extensions extending from the walls in the first direction and disposed separately from each other in the second direction,
    wherein the space is defined between the walls, and
    wherein the low stiffness portion is fastened to the extensions.

8. The electrically-powered vehicle according to claim 2,
    wherein the second housing comprise the low stiffness portion, and a high stiffness portion having stiffness higher than the stiffness of the low stiffness portion,
    wherein the high stiffness portion comprises:
        walls extending from the first face in the first direction and disposed separately from each other in the second direction; and
        extensions extending from the walls in the first direction and disposed separately from each other in the second direction,
    wherein the space defined between the walls, and
    wherein the low stiffness portion is fastened to the extensions.

9. The electrically-powered vehicle according to claim 3,
    wherein the second housing comprises the low stiffness portion, and a high stiffness portion having stiffness higher than the stiffness of the low stiffness portion, wherein the high stiffness portion comprises:
   walls extending from the first face in the first direction and disposed separately from each other in the second direction; and
   extensions extending from the walls in the first direction and disposed separately from each other in the second direction,
wherein the space is defined between the walls, and
wherein the low stiffness portion is fastened to the extensions.

10. The electrically-powered vehicle according to claim 4, wherein the second housing comprises the low stiffness portion, and a high stiffness portion having stiffness higher than the stiffness of the low stiffness portion,
wherein the high stiffness portion comprises;
   walls extending from the first face in the first direction and disposed separately from each other in the second direction; and
   extensions extending from the walls in the first direction and disposed separately from each other in the direction,
wherein the space is defined between the walls, and
wherein the low stiffness portion is fastened to the extensions.

11. The electrically-powered vehicle according to claim 5, wherein the second housing comprises the low stiffness portion, and a high stiffness portion having stiffness higher than the stiffness of the low stiffness portion,
wherein the high stiffness portion comprises:
   walls extending from the first fac in the first direction and disposed separately from each other in the second direction; and
   extensions extending from the walls in the first direction and disposed separately from each other in the second direction,
wherein the space is defined between the walls, and
wherein the low stiffness portion is fastened to the extensions.

12. The electrically-powered vehicle according to claim 6, wherein the second housing comprises the low stiffness portion, and a high stiffness portion having stiffness higher than the stiffness of the low stiffness portion,
wherein the high stiffness portion comprises:
   walls extending from the first face in the first direction and disposed separately from each other in the second direction; and
   extensions extending from the walls in the first direction and disposed separately from each other in the second direction,
wherein the space is defined between the walls, and
wherein the low stiffness portion is fastened to the extensions.

13. The electrically-powered vehicle according to claim 1, wherein the low stiffness portion comprises a first surface that extends in the second direction and covers the one side of the high voltage battery, and
wherein the charger includes a lateral surface extending along and adjacent to the first surface of the low stiffness portion.

14. The electrically-powered vehicle according to claim 1, wherein the first housing comprises a metal,
wherein the low stiffness portion comprises a first surface that extends in the second direction and covers the one side of the high voltage battery, and
wherein the charger includes a lateral surface extending along and adjacent to the first surface of the low stiffness portion.

15. The electrically-powered vehicle according to claim 1, wherein the low stiffness portion comprises a first surface that extends in the second direction and covers the one side of the high voltage battery, and a second surface extending from the first surface in the first direction, and
wherein the charger comprises a lateral surface extending along the first surface and a bottom surface extending along the second surface.

16. The electrically-powered vehicle according to claim 7, wherein, in a third direction perpendicular to the first direction and the second direction, each of the extensions has a first height less than a second height of each of the walls.

17. The electrically-powered vehicle according to claim 1, wherein, in the first direction, a first charger edge of the charger in the second direction is disposed adjacent to a first battery edge of the high voltage battery in the second direction, and
wherein, in the first direction, a second charger edge of the charger opposed to the first charger edge is disposed adjacent to a second battery edge of the high voltage battery opposed to the first battery edge.

18. The electrically-powered vehicle according to claim 1, wherein the charger further includes a cooling fan protruded from the first housing.

* * * * *